No. 874,696. PATENTED DEC. 24, 1907.
W. F. M. McCARTY.
AUTOMATIC INCUBATOR.
APPLICATION FILED APR. 11, 1907.
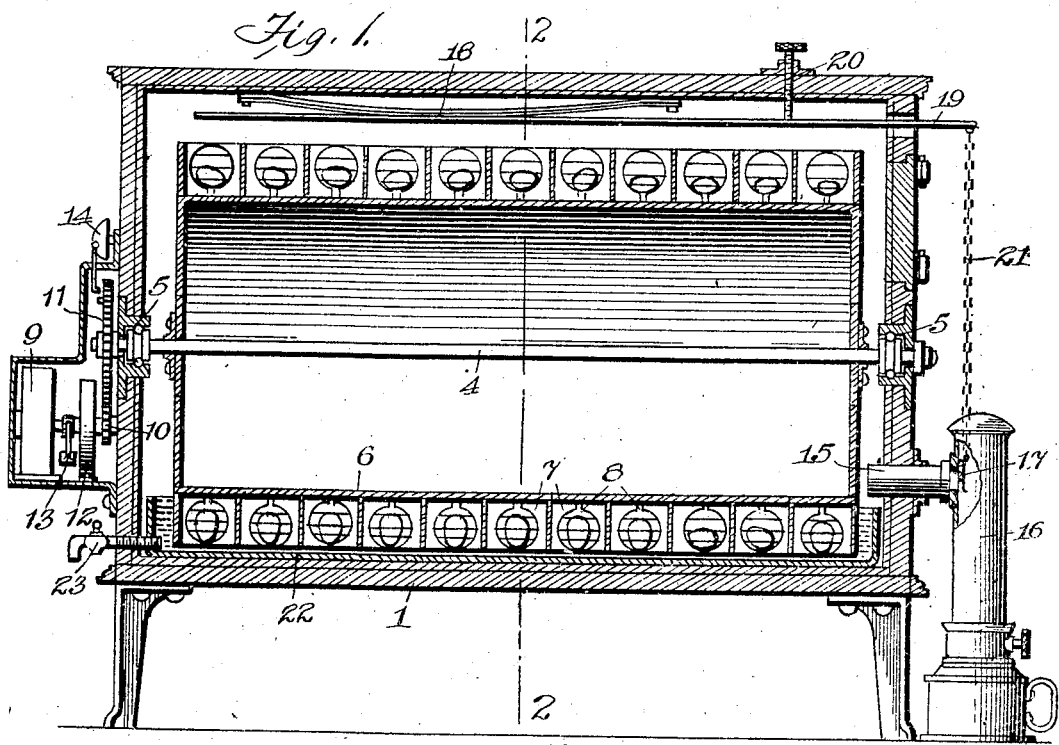
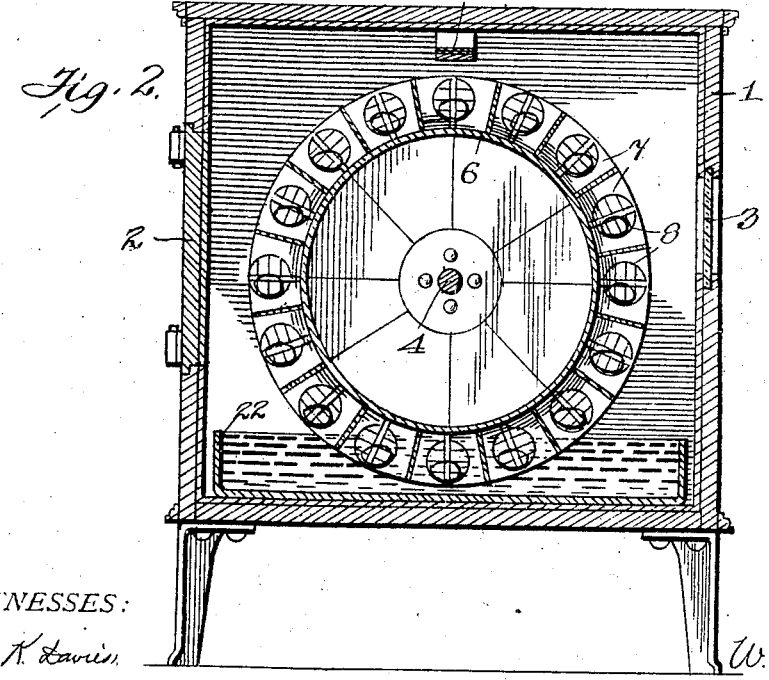
WITNESSES: INVENTOR
Chas. K. Davis W. F. M. McCarty
Myron F. Clear BY
C. L. Parker
Attorney

UNITED STATES PATENT OFFICE.

WILLIAM F. MASON McCARTY, OF PLEASANTVILLE, NEW YORK.

AUTOMATIC INCUBATOR.

No. 874,696.  Specification of Letters Patent.  Patented Dec. 24, 1907.

Application filed April 11, 1907. Serial No. 367,546.

*To all whom it may concern:*

Be it known that I, WILLIAM F. MASON McCARTY, a citizen of the United States, residing at Pleasantville, in the county of Westchester and State of New York, have invented certain new and useful Improvements in Automatic Incubators, of which the following is a specification.

My invention relates to incubators, and more particularly to an incubator which will be automatic in its action from the time the eggs are inserted until the hatching takes place.

The object of my invention is to provide a simple and cheap construction in which the eggs will be in constant movement, and therefore uniformly heated; in which the eggs while in motion will be moistened to the desired degree; in which the introduction of heat will be automatically regulated, and in which the movement of the eggs will be effected from a suitable source of power, automatically regulated by a mechanism designed to periodically complete a movement of the eggs.

With these objects in view my invention resides in the following features of construction, arrangement and operation as will be hereinafter described with reference to the accompanying drawings, in which, Figure 1 is a vertical longitudinal view taken through my improved incubator, and Fig. 2 is a section on the line 2—2 of Fig. 1.

In the practical embodiment of my invention I provide a suitably supported casing 1, having a door 2, and a transparent section, such as is shown at 3, in order that the interior of the casing may be viewed without opening said door 2. Mounted longitudinally within the casing 1 and having its central shaft 4 mounted in the roller bearings 5 in said casing, is a rotatable cylinder 6 provided with peripheral egg pockets 7, radially constructed upon the circumference of said cylinder, each of said pockets being provided with two-part spring wire cages 8, adapted to be sprung apart to receive and hold the egg during the rotation of said cylinder.

A spring, electrical or other motor 9 is suitably supported adjacent one end of the casing 1 to drive said cylinder 6 by means of the spur gears 10 and 11, and said motor 9 is regulated in its drive by means of a clock work mechanism, arranged concentric with said motor at 12, its escapement 13 being operated to maintain the complete rotation of the cylinder 6 in periods, for instance, two complete rotations in every twenty-four hours. A bell 14 is adapted to be struck or sounded upon each complete revolution of the cylinder 6, as shown.

An inlet 15 is arranged through the casing 1 from the heater 16 to convey the heat within said casing, said heater 16 having a cutoff valve 17 arranged therein at the mouth of inlet pipe 15, and adapted to be operated by a thermostat 18 to close said inlet upon an excessive temperature within the casing 1 by means of a rod 19 whose upward movement is limited by an adjustable stop 20, and which is adapted to be moved downwardly upon the expansion of said thermostat allowing said valve 17 connected to the end of said rod 19 by means of a chain or other connection 21, to drop.

In the bottom of the casing 1 I arrange a tank or vessel 22 in such manner that upon the rotation of the cylinder 6 the eggs carried therein pass entirely within said vessel, which is adapted to contain heated water by which the eggs are moistened to a suitable degree. Said tank is further provided with an outlet 23.

It will be seen from the foregoing description that by means of their loose connection within the cages 8, the eggs will be uniformly heated, and by means of the water receptacle 22 will be uniformly moistened throughout the period of operation, the water being, of course, withdrawn previous to the appearance of the chicks. It will also be seen that by means of the motor and the clockwork mechanism associated therewith, I am able to uniformly and periodically rotate the egg carrying cylinder, and that by means of the alarm bell 14 I am able to keep in touch with such rotation.

While the elements herein shown and described are well adapted to serve the functions set forth, it is obvious that various minor changes may be made in the construction, arrangement and operation of the several parts without departing from the spirit and scope of my invention, as defined in the appended claims.

Having thus fully described my invention I claim:

1. In an automatic incubator, the combination of a rotatable egg carrying cylinder, a moistening device arranged in the path of travel of the eggs, and means for imparting periodic rotations to said cylinder, substantially as described.

2. In an automatic incubator, the combination of a rotatable cylinder, egg holding pockets formed on the circumference thereof, a moistening device arranged in the path of travel of the eggs within said pockets, and means for imparting periodic rotations to said cylinder, substantially as described.

3. In an automatic incubator, the combination of a rotatable cylinder, egg holding pockets formed on the circumference thereof, spring cages mounted within said pockets, and adapted to loosely hold the eggs, a moistening device arranged in the path of travel of the eggs within said pocket, and means for imparting periodic rotation to said cylinder, substantially as described.

4. In an automatic incubator, the combination of a suitably mounted casing, having a transparent section, means for supplying heat thereto, a rotatable egg carrying cylinder mounted therein, a moistening device arranged in the path of travel of the eggs, and means for imparting periodic rotation to said cylinder, substantially as described.

5. In an automatic incubator, the combination of a suitably mounted casing provided with a thermostatically regulated heat supply, a rotatable egg carrying cylinder mounted therein, a moistening device arranged in the path of travel of the eggs, and means for imparting periodic rotation to said cylinder, substantially as described.

6. In an automatic incubator, the combination of a suitably mounted casing provided with a thremostatically regulated heat supply, a rotatable cylinder mounted within said casing and provided with egg holding pockets formed on the circumference thereof, two-part cages spring mounted within said pockets and adapted to loosely hold the eggs, a moistening device arranged in the path of travel of the eggs within said pockets, and means for imparting periodic rotation to said cylinder, substantially as described.

In testimony whereof I affix my signature in presence of two witnesses.

WILLIAM F. MASON McCARTY.

Witnesses:
E. J. STANTENBURGH,
H. H. RISLEY.